3,244,743
ACTINAMINE, ACYLATED AND N,N'-ALKYLATED DERIVATIVES OF ACTINAMINE AND THE PREPARATION OF ACTINAMINE BY ACID HYDROLYSIS OF ACTINOSPECTACIN
Paul F. Wiley, Texas Township, Kalamazoo County, Mich., assignor to The Upjohn Company, Kalamazoo, Mich., a corporation of Delaware
No Drawing. Filed Jan. 22, 1962, Ser. No. 167,912
14 Claims. (Cl. 260—488)

This invention is related to novel compositions of matter and to a process for the preparation thereof, and is particularly directed to the novel compound, actinamine, and its alkyl and acyl derivatives and to a process for producing the same.

Actinospectacin is a biosynthetic product produced by the controlled fermentation of *Streptomyces spectabilis*. Various methods for the production, recovery, and purification of actinospectacin are described in the published literature, e.g., D. J. Mason et al., Antibiotics and Chemotherapy, 11, p. 118, 1961; M. E. Bergy et al., Antibiotics and Chemotherapy, 11, p. 661, 1961; in Union of South Africa Patent No. 60/4098 and in Belgian Patent No. 596,175. Actinospectacin is characterized by an optical rotation $[\alpha]_D^{25} = -20°(H_2O)$; by solubility in water, methanol, and ethanol, and by insolubility in acetone and hydrocarbon solvents; and by the presence of two basic groups: $pKa_1$ 6.95 $(H_2O)$, $pKa_2$ 8.70 $(H_2O)$. It was formerly thought that the molecular formula was $C_{14}H_{26}N_2O_7$ but has since been shown that it is $C_{14}H_{24}N_2O_7$.

It has now been found that a novel compound according to this invention is obtained by acting upon actinospectacin (I) with concentrated hydrochloric acid. By this procedure, the actinospectacin molecule is cleaved, yielding a new compound 1,3-deoxy-1,3-bis(methylamino)-myoinositol which has been named actinamine (II). On acylation actinamine is converted to hexaacylactinamine, which on methanolysis yields N,N-diacylactinamine. Actinamine and its acylates can be represented by the following formula:

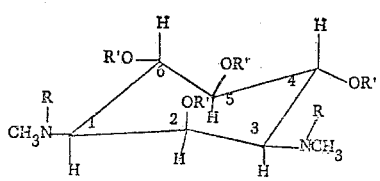

wherein R and R' are selected from the group consisting of hydrogen; hydrocarbon carboxylic acid acyl of from two to twelve carbon atoms, inclusive; halo-, nitro, hydroxy-, amino-, cyano-, thiocyano-, and loweralkoxy-substituted hydrocarbon carboxylic acid acyl of from two to twelve carbon atoms, inclusive; and loweralkoxycarbonyl.

The term "hydrocarbon carboxylic acid acyl of from two to twelve carbon atoms" whenever used in the specification or claims is intended to mean an acyl corresponding to a hydrocarbon carboxylic acid of from two to twelve carbon atoms, inclusive. Suitably such acids include (a) a saturated or unsaturated, straight or branched chain aliphatic carboxylic acid, for example, acetic, propionic, butyric, isobutyric, tert-butylacetic, valeric isovaleric, caproic, caprylic, decanoic, dodecanoic, acrylic, crotonic, hexynoic, heptynoic, octynoic acids, and the like; (b) a saturated or unsaturated cycloaliphatic carboxylic, acid for example, cyclobutanecarboxylic acid, cyclopentanecarboxylic acid, cyclopentenecarboxylic acid, pentanepropionic acid, cyclopenteneacetic acid, cycloboxylic acid, dimethylcyclohexenecarboxylic acid, dipropylcyclohexanecarboxylic acid, and the like; (c) a saturated or unsaturated cyclo-substituted aliphatic carboxylic acid, for example, cyclopentaneacetic acid, cyclopentanepropionic acid, cyclopenteneacetic acid, cyclohexanebutyric acid, methylcyclohexaneacetic acid, and the like; (d) an aromatic carboxylic acid, for example, benzoic acid, toluic acid, naphthoic acid, ethylbenzoic acid, isobutylbenzoic acid, methylbutylbenzoic acid, and the like, and (e) an aromatic-aliphatic carboxylic acid, for example, phenylacetic acid, phenylpropionic acid, phenylvaleric acid, cinnamic acid, phenylpropiolic acid, naphthylacetic acid, and the like.

The term "halogen-, nitro-, hydroxy-, amino-, cyano-, thiocyano-, and lower-alkoxy-substituted hydrocarbon carboxylic acid acyl of from two to twelve carbon atoms, inclusive" is intended to mean hydrocarbon carboxylic acid acyl as hereinbefore defined which are substituted by two or more halogen atoms, nitrohydroxy, amino, cyano, thiocyano, or lower-alkoxy groups. By "loweralkoxy" is meant an alkoxy group of from one to six carbon atoms, inclusive, for example, methoxy, ethoxy, propoxy, butoxy, amyloxy, hexyloxy, and isomeric forms thereof. Examples of substituted hydrocarbon carboxylic acid acyl falling within the above definition are the acyl corresponding to chloroacetic acid, chloropropionic acid, bromobutyric acid, iodovaleric acid, chlorocyclohexanecarboxylic acid, o-, m-, and p-chlorobenzoic acid, anisic acid, salicyclic acid, p-hydroxybenzoic acid, o-, m-, and p-nitro-benzoic acid, cyanoacetic acid, thiocyanoacetic acid, cyanopropionic acid, lactic acid, glycine, ethoxyformic, and the like.

It has also been found that upon alkylation, actinamine (II) is converted to N,N'-dialkylactinamine which upon acylation is converted to N,N'-di-lower-alkyl-$O_2$, $O_4$, $O_5$, $O_6$-tetraacylactinamine. Examples of loweralkyl include methyl, ethyl, propyl, butyl, amyl, hexyl, heptyl, octyl and the isomeric forms thereof.

Actinamine (II) according to the invention is obtained by contacting actinospectacin, either in the form of the free base or in the form of an acid addition salt, with an acidic material, e.g., a strong mineral acid such as hydrogen chloride, hydrogen bromide, hydrogen iodide, sulfuric acid, phosphoric acid, and the like. Preferably, hydrochloric acid is used as the hydrolyzing agent and when so used the actinamine (II) is isolated as a hydrochloride. When the other acids listed above are used for hydrolysis, the product is isolated as the corresponding mineral acid salt. The actinamine salt can be converted to the free base by treatment with a strongly basic anion exchange resin. Suitable anion exchange resins for this purpose are obtained by chlormethylating by the procedure given on pages 88 and 97 of Kunin, Ion Exhange Resins, 2nd Ed. (1958), John Wiley and Sons, Inc., polystyrene crosslinker, if desired, with divinylbenzene prepared by the procedure given on page 84 of Kunin, supra, and quaternizing with trimethylamine, or dimethylalkanolamine by the procedure given on page 97 of Kunin, supra. Anion exchange resins of this type are marketed under the trade names Dowex-2, Dowex-20, Amberlite IRA-400, Duolite A-102, and Permutit S-1.

Crude actinamine can be upgraded by passage over a cation exchange resin. Both carboxylic and sulfonic acid types can be used. Suitable carboxylic acid resins include the polyacrylic acid resins obtained by the copolymerization of acrylic acid and divinylbenzene by the procedure given on page 87 by Kunin, Ion Exchange Resins, 2nd Ed. (1958), John Wiley and Sons, Inc. Carboxylic acid cation exchange resins of this type are marketed under the trade names Amberlite IRC–50 and Zeokarb 226. Suitable sulfonic acid resins include nuclear sulfonated polystyrene resins crosslinked with divinylbenzene obtained by the procedure given on page 84 of Kunin, supra. Sulfonated cation exchange resins of this type are marketed under the trade names, Dowex-50, Amberlite IR-120, Nalcite HCR, Chempro C-20, Permutit Q, and Zeokarb 225.

When actinamine (II) is reacted with an appropriate acid anhydride or chloride, the corresponding hexaacylactinamine is obtained. For example, on reacting actinamine (II) with acetic anhydride and sodium acetate, hexaacetylactinamine (III) is obtained, and with ethyl chlorocarbonate, hexaethoxycarbonylactinamine (VI) is obtained. Upon methanolysis of the hexaacylactinamine with cold anhydrous methanol saturated with ammonia the N,N'-diacylactinamine is obtained. For example, methanolysis of hexaacetylactinamine (III) with cold anhydrous methanol saturated with ammonia results in the formation of N,N'-diacetylactinamine (IV) and methanalysis of hexaethoxycarbonylactinamine (VI) in a like manner yields N,N'-bis(ethoxy carbonyl)actinamine (VII). Mixed acylates can be obtained by acylating N,N'-diacylactinamine with a different acylating agent. For example, on reacting N,N'-diacetylactinamine with sodium propionate and propionic anhydride, succinic anhydride, maleic anhydride, phthalic anhydride, and the like, the corresponding mixed acylate is obtained.

Further, novel compounds of this invention are obtained by alkylation of actinamine (II) with a suitable alkylating agent, thus giving the desired N,N'-di-lower-alkylactinamine. For example, methylation of actinamine (II) by Witkop's procedure (G. F. Holland, R. C. Durant, S. L. Friess, and B. Witkop, J. Am. Chem. Soc. 80, 6031 (1958) gives N,N'-dimethylactinamine (V) as the dihydrochloride, or for example, alkylation of actinamine by Hoffmann's procedure (Wheeler and Hoffmann, J. Am. Chem. Soc. 44, 113 (1911) will yield other N,N'-di-lower-alkylactinamines.

The N,N'-di-lower-alkylactinamine salts can be converted to the free base by treatment with a strongly basic anion exchange resin as described above for the actinamine salts. The N,N'-di-lower-alkylactinamine can be converted from the free base to other salt forms by contacting it with an acidic material, e.g., acids such as hydrogen chloride, hydrogen bromide, hydrogen iodide, sulfuric acid, phosphoric acid, picric acid, helianthic acid, Reinicke's acid, succinic acid, maleic acid, lactic acid, trichloroacetic acid, and the like. These salts are useful as intermediates from which high purity actinamine can be recovered when desired by treatment with an anion exchange resin as described above.

The novel compounds of the invention, actinamine (II) and the N,N'-di-lower-alkyl derivatives (V) of actinamine are useful in accordance with U.S. Patents 1,915,334 and 2,075,359, in preparing amine fluosilicate mothproofing agents, and in accordance with U.S. Patents 2,425,320 and 2,606,155, in preparing amine thiocyanate-formaldehyde condensation products for use as pickling inhibitors. They can also be reacted, either as the salt or free base with formaldehyde and sodium sulfide to form complex aminomethyl sulfides useful as pickling inhibitors. Actinamine and the N,N'-di-lower-alkyl derivatives of actinamine can also be used as buffering and antacid agents.

The acylates of actinamine, such as compounds (III), (IV), (VI), and (VII), described above, have antibacterial activity and can be used to decontaminate aquaria of the fish pathogen, *Aeromonas liquefaciens* which causes infectious dropsy, or to treat fish affected by this organism. Also, these novel compounds can be used to inhibit the growth of the bacterium *Flavobacterium suaveolans* which is a common contaminant of the paper-mill industry. Further, these novel compounds can be used to inhibit the growth of *Erysipelothrix rhusiopathiae* which is a pathogen found in swine, sheep, turkeys, pigeons, and mice.

The following examples are illustrative of the process and products of the present invention, but are not to be construed as limiting.

EXAMPLE 1.—PREPARATION OF ACTINAMINE

A solution of 2 g. of actinospectacin sulfate in 20 ml. of 6.0 N hydrochloric acid was refluxed for six hours. The tar was removed by filtration, and the filtrate was extracted with three 10-ml. portions of chloroform. The aqueous layer was isolated and then evaporated to dryness under reduced pressure to yield a residue which was slurried with methanol. This mixture was then evaporated to dryness under reduced pressure to a solid which was then slurried with methanol. The mixture was then evaporated to dryness to yield 0.52 g. of solids. The 0.52 g. were dissolved in 10 ml. water and passed over a strongly basic anion exchange resin. (The anion exchange resin used for this purpose was obtained by chlormethylating by the procedure given on pages 88 and 97 of Kunin, Ion Exchange Resins, 2nd ed. (1958), John Wiley and Sons, Inc., polystyrene crosslinked with 5% of divinylbenzene prepared by the procedure given on page 84 of Kunin, supra, and quaternized with trimethylamine by the procedure given on page 97 of Kunin, supra.) The column was washed with water, and the effluent and washings were combined and freeze-dried. This freeze-dried material was then dissolved in water and placed on a cation exchange resin. (The cation exchange resin used for this purpose was obtained by the copolymerization of acrylic acid and 5% of divinylbenzene by the procedure given on page 87 of Kunin, Ion Exchange Resins, 2nd ed. (1958), John Wiley and Sons, Inc.)

The column was then eluted with 100 ml. of 1.0 N hydrochloric acid and the eluate evaporated to dryness under reduced pressure to give a residue. The residue was slurried in methanol and the mixture then evaporated to dryness under reduced pressure to a solid. This dried preparation was slurried in methanol, as above, and then the mixture was evaporated to dryness under reduced pressure to give a residue. This residue was mixed with methanol and the mixture was filtered. The solid material was then dissolved in a water-acetone mixture where crystallization occurred. The crystals were filtered off, then dissolved in another water-acetone mixture. The crystalline actinamine dihydrochloride from this second crystallization procedure was optically inactive and had a melting point of 310° C., a $pKa'_1$ fo 7.22 and a $pKa'_2$ of 8.90 and characteristic infrared absorption at the following wave lengths expressed in reciprocal centimeters:

| | |
|---|---|
| 3200 (S) cm.$^{-1}$ | 1100 (S) |
| 2700 (S) | 1045 (S) |
| 2410 (S) | 1025 (S) |
| 1595 (S) | 935 (S) |
| 1585 (S) | 870 (S) |
| 1340 (S) | 710 (S) |
| 1190 (S) | |

*Elemental analysis.*—Calculated for $C_8H_{18}N_2O_4 \cdot 2HCl$: C, 34.41; H, 7.12; N, 10.05; Cl, 25.45; O, 22.93; molecular weight, 279. Found: C, 34.46; H, 7.12; N, 10.02; Cl, 25.31; O, 21.23; molecular weight, 280.

Treatment of the dihydrochloride with a strongly basic anion exchange resin (prepared as previously described) gave the free base, which had a melting point of 129° C., was optically inactive, and had the following

*Elemental analysis.*—Calculated for $C_8H_{18}N_2O_4$: C, 46.60; H, 8.74; N, 13.59; O, 31.07; molecular weight, 206.2. Found: C, 46.99; H, 8.99; N, 14.06; O, 31.00; molecular weight (electr. titr.), 204.

EXAMPLE 2.—PREPARATION OF HEXAACETYLACTINAMINE

A mixture of 2.0 g. (7.2 millimoles) of actinamine dihydrochloride, 1.2 g. (14.4 millimoles) of anhydrous sodium acetate and 120 ml. of acetic anhydride was heated under reflux for two hours. The mixture was evaporated to dryness under reduced pressure. The residue was extracted with 100 ml. of chloroform, filtered, and the filtrate was evaporated to dryness. The residue was dissolved in 10 ml. of chloroform, and ether was added until crystals began to form. Refrigeration gave 2.7 g. of crystals of hexaacetylactinamine with a melting point of 190 to 194° C. A portion of this was recrystallized four times from chloroform-ether. The final melting point was 196–198° C. There were no titratable groups and the product was optically inactive.

*Elemental analysis.*—Calculated for $C_{20}H_{30}N_2O_{10}$: C, 52.40; H,6.53; N, 6.11; O, 34.93; C—$CH_3$, 19.6. Found: C, 52.34; H, 6.71; N, 6.20; O, 34.06; C—$CH_3$, 18.9.

EXAMPLE 3

By substituting the anhydrous sodium acetate and acetic anhydride in Example 2 by acetyl chloride and a stoichiometric amount of triethylamine there is obtained hexaacetylactinamine.

EXAMPLE 4

By substituting the anhydrous sodium acetate and acetic anhydride in Example 2 by propionyl chloride and a stoichiometric amount of triethylamine there is obtained hexapropionylactinamine.

EXAMPLE 5

By substituting the anhyrous sodium acetate and acetic anhydride in Example 2 by butyryl chloride and a stoichiometric amount of triethylamine there is obtained hexabutyrylactinamine.

EXAMPLE 6

By substituting the anhydrous sodium acetate and acetic anhydride in Example 2 by valeryl chloride and a stoichiometric amount of triethylamine there is obtained hexavalerylactinamine.

EXAMPLE 7

By substituting the anhydrous sodium acetate and acetic anhydride in Example 2 by caproyl chloride and a stoichiometric amount of triethylamine there is obtained hexacaproylactinamine.

EXAMPLE 8

By substituting the anhydrous sodium acetate and acetic anhydride in Example 2 by heptanoyl chloride and a stoichiometric amount of triethylamine there is obtained hexaheptanoylactinamine.

EXAMPLE 9

By substituting the anhydrous sodium acetate and acetic anhydride in Example 2 by caprylyl chloride and a stoichiometric amount of triethylamine there is obtained hexacaprylylactinamine.

EXAMPLE 10

By substituting the anhydrous sodium acetate and acetic anhydride in Example 2 by methyl chlorocarbonate and a stoichiometric amount of triethylamine there is obtained hexamethoxycarbonylactinamine.

EXAMPLE 11

By substituting the anhydrous sodium acetate and acetic anhydrides in Example 2 by methyl chlorocar- and stoichiometric amount of triethylamine there is obtained hexaethoxycarbonylactinamine.

EXAMPLE 12

By substituting the anhydrous sodium acetate and acetic anhydride in Example 2 by propyl chlorocarbonate and stoichiometric amount of triethylamine there is obtained hexapropoxycarbonylactinamine.

EXAMPLE 13

By substituting the anhydrous sodium acetate and acetic anhydride in Example 2 by butyl chlorocarbonate and a stoichiometric amount of of triethylamine there is obtained hexabutoxycarbonylactinamine.

EXAMPLE 14

By substituting the anhydrous sodium acetate and acetic anhydride in Example 2 by pentyl chlorocarbonate and a stoichiometric amount of triethylamine there is obtained hexapentyloxycarbonylactinamine.

EXAMPLE 15

By substituting the anhydrous sodium acetate and acetic anhydride in Example 2 by hexyl chlorocarbonate and a stoichiometric amount of triethylamine there is obtained hexahexyloxycarbonylactinamine.

EXAMPLE 16

By substituting the anhydrous sodium acetate and acetic anhydride in Example 2 my heptyl chlorocarbonate and a stoichiometric amount of triethylamine there is obtained hexaheptyloxycarbonylactinamine.

EXAMPLE 17

By substituting the anhydrous sodium acetate and acetic anhydride in Example 2 by octyl chlorocarbonate and a stoichiometric amount of triethylamine there is obtained hexaoctyloxycarbonylactinamine.

EXAMPLE 18.—PREPARATION OF N,N'-DIACETYLACTINAMINE 500 ml. of anhydrous methanol was cooled in an ice bath and saturated with ammonia. Hexaacetylactinamine (5.3 g.), prepared as in Example 2, was dissolved in the methanol, and the solution was allowed to stand at room temperature for 24 hrs. The volatile material was removed by evaporation under reduced pressure. The residue was dissolved in boiling methanol, and the methanolic solution was concentrated until crystallization began. Refrigeration of the solution yielded 1.45 g. of crystalline N,N'-diacetylactinamine which had a melting point of 243–247° C. Two further recrystallizations from methanol raised the melting point to 250 to 252° C.

There were no titratable groups present and the product was optically inactive.

*Elemental analysis.*—Calculated for $C_{12}H_{22}N_2O_6$: C, 49.65; H, 7.58; N, 9.65; $CH_3CO$, 29.6. Found: C, 49.77; H, 7.65; N, 9.47; $CH_3CO$, 23.3.

EXAMPLE 19

By substituting the hexaacetylactinamine in Example 18 by hexapropionylactinamine there is obtained N,N'-dipropionylactinamine.

EXAMPLE 20

By substituting the hexaacetylactinamine in Example 18 by hexabutyrylactinamine there is obtained N,N'-dibutyrylactinamine.

EXAMPLE 21

By substituting the hexaacetylactinamine in Example 18 by hexavalerylactinamine there is obtained N,N'-divalerylactinamine.

EXAMPLE 22

By substituting the hexaacetylactinamine in Example 18 by hexacaproylactinamine there is obtained N,N'-dicaproylactinamine.

EXAMPLE 23

By substituting the hexaacetylactinamine in Example 18 by hexaheptanoylactinamine there is obtained N,N'-diheptanoylactinamine.

EXAMPLE 24

By substituting the hexaacetylactinamine in Example 18 by hexacaprylylactinamine there is obtained N,N'-dicaprylylactinamine.

EXAMPLE 25

By substituting the hexaacetylactinamine in Example 18 by hexamethoxycarbonylactinamine there is obtained N,N'-bis(methoxycarbonyl)actinamine.

EXAMPLE 26

By substituting the hexaacetylactinamine in Example 18 by hexaethoxycarbonylactinamine there is obtained N,N'-bis(ethoxycarbonyl)actinamine.

EXAMPLE 27

By substituting the hexaacetylactinamine in Example 18 by hexapropoxycarbonylactinamine there is obtained N,N'-bis(propoxycarbonyl)actinamine.

EXAMPLE 28

By substituting the hexaacetylactinamine in Example 18 by hexabutoxycarbonylactinamine there is obtained N,N'-bis(butoxycarbonyl)actinamine.

EXAMPLE 29

By substituting the hexaacetylactinamine in Example 18 by hexapentyloxycarbonylactinamine there is obtained N,N'-bis(pentyloxycarbonyl)actinamine.

EXAMPLE 30

By substituting the hexaacetylactinamine in Example 18 by hexahexyloxycarbonylactinamine there is obtained N,N'-bis(hexyloxycarbonyl)actinamine.

EXAMPLE 31

By substituting the hexaacetylactinamine in Example 18 by hexaheptyloxycarbonylactinamine there is obtained N,N'-bis(heptyloxycarbonyl)actinamine.

EXAMPLE 32

By substituting the hexaacetylactinamine in Example 18 by hexaoctyloxycarbonylactinamine there is obtained N,N'-bis(octyloxycarbonyl)actinamine.

EXAMPLE 33.—PREPARATION OF N,N'-DIMETHYLACTINAMINE DIHYDROCHLORIDE

Actinamine (1.9 g.) was dissolved in a mixture of 13.5 ml. of formic acid and 7.0 ml. of formalin. This solution was heated under reflux for 24 hrs. After the addition of 20 ml. of concentrated hydrochloride acid, the solution was evaporated to dryness under reduced pressure. The residue was dissolved in 25 ml. of concentrated hydrochloric acid and again evaporated to dryness under reduced pressure. Trituration of the residue with absolute alcohol gave 2.6 g. of crystalline material melting at 252° to 255° C. This material was then converted to free base by dissolving it in 30 ml. of water and removing chloride ion with 50 ml. of an anion exchange resin having a styrene-divinylbenzene matrix prepared as described in Example 1. The resulting aqueous solution was evaporated to dryness under reduced pressure. An excess of 1.0 N hydrochloric acid was added to the residue, and the solution was evaporated to dryness under reduced pressure. The residue was triturated with alcohol until crystallization occurred. The resulting crystalline N,N'-dimethylactinamine dihydrochloride, was optically inactive, had pKa's of 6.85 and 8.78 and melted at 253 to 255° C.

*Elemental analysis.*—Calculated for $C_{19}H_{22}N_2O_4 \cdot 2HCl$: C, 39.09; H, 7.82; N, 9.13; N—CH$_3$, 19.54; molecular weight, 307. Found: C, 38.91; H, 7.85; N, 9.01; N—CH$_3$, 18.3; molecular weight (elect. titr.), 318.

EXAMPLE 34

By substituting the actinamine in Examples 1 through 17 by the N,N'-dimethylactinamine of Example 33, the corresponding N,N'-dimethyl-$O_2,O_4,O_5,O_6$-tetraacylactinamines are obtained.

I claim:

1. A compound selected from the group consisting of actinamine which has the formula:

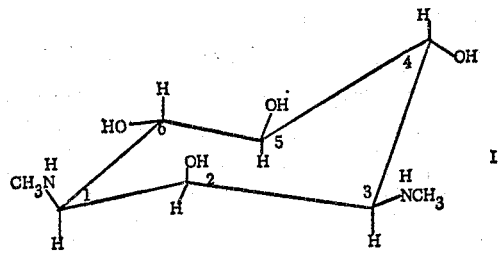

and its acid addition salts.

2. Actinamine having the structural Formula I.
3. The dihydrochloride of the compound having the structural Formula I.
4. A compound of the formula:

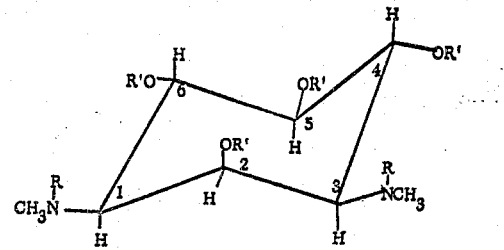

wherein R and R' are selected from the group consisting of hydrocarbon carboxylic acid acyl of from two to twelve carbon atoms, inclusive; halo-, nitro-, hydroxy-, amino-, cyano-, thiocyano- and lower-alkoxy-substituted hydrocarbon carboxylic acid acyl of from two to twelve carbon atoms, inclusive; and lower-alkoxycarbonyl.

5. Hexaacetylactinamine having the structural Formula II wherein R and R' are acetyl.

6. A compound of the formula:

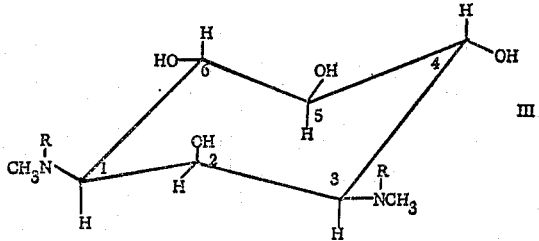

wherein R is selected from the group consisting of hydrocarbon carboxylic acid acyl of from two to twelve carbon atoms, inclusive; halo-, nitro-, hydroxy-, amino-, cyano-, thiocyano-, and lower-alkoxy-substituted hydrocarbon carboxylic acid acyl of from two to twelve carbon atoms, inclusive; and lower-alkoxycarbonyl.

7. N,N'-di-lower-alkanoylactinamine having the structural Formula III wherein R is lower alkanoyl.

8. N,N'-diacetylactinamine having the structural Formula III wherein R is acetyl.

9. A compound selected from the class consisting of (1) compounds of the formula shown in claim 4 wherein R is lower alkyl and R' is selected from the group consisting of hydrogen; hydrocarbon carboxylic acid acyl of from two to twelve carbon atoms, inclusive; halo-, nitro-, hydroxy-, amino-, cyano-, thiocyano-, and lower-alkoxy-substituted hydrocarbon carboxylic acid acyl of from two to twelve carbon atoms, inclusive; and lower-alkoxycarbonyl; and (2) the acid addition salts thereof.

10. N,N'-di-lower-alkylactinamine having the structural Formula II wherein R is lower alkyl and R' is hydrogen.

11. The dihydrochloride of the compound having the structural Formula II wherein R is lower alkyl and R' is hydrogen.

12. N,N'-dimethylactinamine having the structural Formula II wherein R is methyl and R' is hydrogen.

13. The dihydrochloride of the compound having the structural Formula II wherein R is methyl and R' is hydrogen.

14. A process which comprises hydrolyzing actinospectacin with a mineral acid to produce actinamine having the structural Formula I.

References Cited by the Examiner
UNITED STATES PATENTS 2,557,560 6/1951 Peck _____ 260—563
2,590,831 3/1952 Wolfrom et al. _____ 260—563

LORRAINE A. WEINBERGER, *Primary Examiner.*

ABRAHAM H. WINKELSTEIN, LEON ZITVER,
*Examiners.*

A. E. TANENHOLTZ, D. P. CLARKE, V. GARNER,
*Assistant Examiners.*